Nov. 4, 1941.  R. C. SHANNON  2,261,527
HOLDER FOR BEACH AND LAWN UMBRELLAS
Filed Sept. 19, 1940
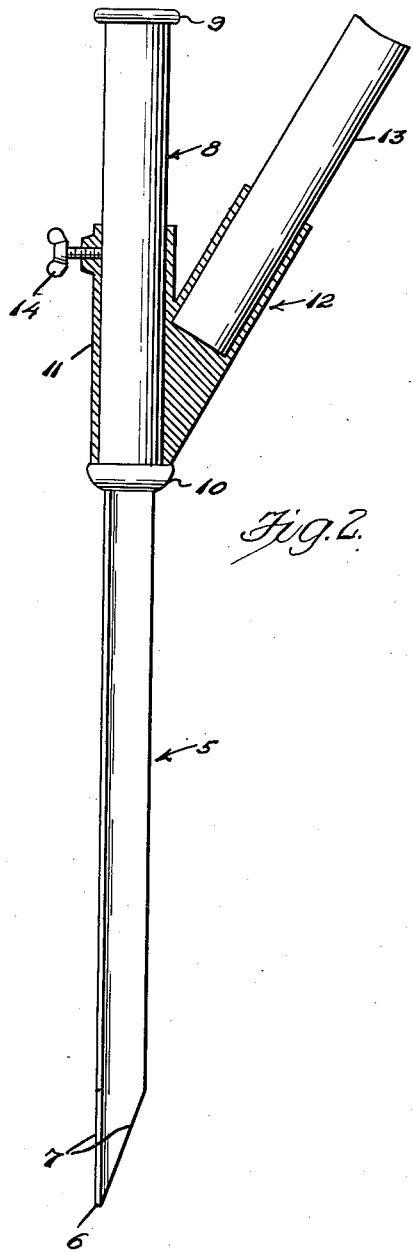
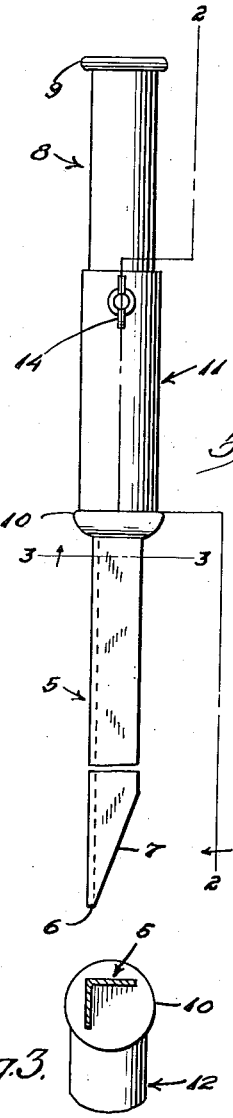
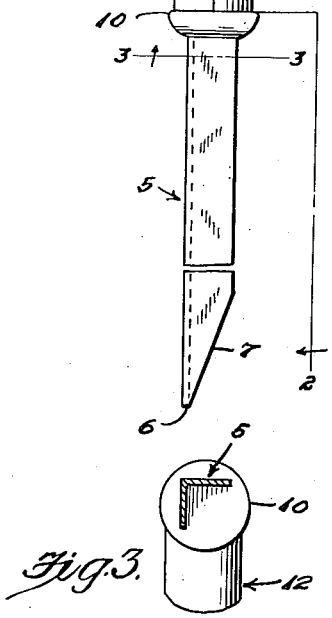
Inventor
Ronald Clair Shannon
By Clarence A. O'Brien
Attorney Patented Nov. 4, 1941

2,261,527

UNITED STATES PATENT OFFICE 2,261,527

HOLDER FOR BEACH AND LAWN UMBRELLAS

Ronald Clair Shannon, Pasadena, Calif.

Application September 19, 1940, Serial No. 357,467

6 Claims. (Cl. 248—44)

My invention relates to a holder for beach and lawn umbrellas, and the primary object of the invention is to provide a holder of this character which is easily and quickly inserted into the ground for support and as easily removed, and which permits the umbrella to be rotated on the vertical axis of the holder to any position of rotation without disturbing the impaled portion of the holder, and which also provides for adjusting the height of the umbrella above the lawn or beach.

Another important object of my invention is to provide an arrangement of the character indicated above which can be provided in a simple and inexpensive form so as to be readily marketable.

Other important objects and advantages of my invention will be apparent from a reading of the following description taken in connection with the appended drawing, wherein for purposes of illustration I have shown a preferred embodiment of my invention.

In the drawing:

Figure 1 is a general side elevational view of the embodiment.

Figure 2 is an enlarged sectional elevational view taken through Figure 1 along the line 2—2 and looking toward the left in the direction of the arrow.

Figure 3 is a horizontal sectional view taken through Figure 1 along the line 3—3 and looking upwardly in the direction of the arrow.

Referring in detail to the drawing, the numeral 5 generally designates the stake portion of the holder, the stake being conveniently formed of angle iron and pointed at its lower end as indicated by the numeral 6 through angularly reducing the edges of the flanges forming the stake as indicated by the numeral 7. The upper end of the stake is integral with or secured to a cylindrical body 8 which has at its upper end a flange 9 acting as a limit stop and has at its lower end a collar 10 acting as an anvil and as a stop. The body 8 is preferably formed of a section of pipe.

Slidable vertically along the body 8 between the stops 9 and 10 is a sleeve 11 which is preferably cylindrical in form and is shorter than the distance between the stops 9 and 10 to permit the required vertical adjustment of the sleeve 11 along the body 8 to provide for vertical adjustment of the umbrella above the lawn or above the beach; and to provide for the necessary amplitude of reciprocation of the sleeve 11 to effect entry of the stake 5 in the lawn or sand of the beach by raising and lowering the sleeve 11 so as to strike the anvil 10 a sufficient number of blows to drive the stake into place.

Projecting laterally and upwardly from the lower part of the sleeve 11 is the socket 12 which receives the handle 13 of the beach or lawn umbrella (not shown) so as to hold the same in a lateral acutely angulated position with respect to the axis of the holder.

For securing the sleeve 11 in a desired position of rotation or in a desired position of vertical adjustment along the sleeve 8, I provide a finger nut equipped set screw 14 threaded through the upper side wall of the sleeve 11.

Although I have shown and described herein a preferred embodiment of my invention, it is to be definitely understood that I do not wish to limit the application of the invention thereto except as may be required by the scope of the subjoined claims.

Having described the invention, what is claimed as new is:

1. A holder for a beach or lawn umbrella, said holder comprising a stake adapted to be driven into the beach or lawn, a cylindrical body on the upper end of said stake, said body having upper and lower stop flanges thereon, a sleeve having a cylindrical bore slidably mounted on said body between said stop flanges, a lateral socket on said sleeve for receiving and supporting the handle of the umbrella.

2. A holder for a beach or lawn umbrella, said holder comprising a stake adapted to be driven into the beach or lawn, a cylindrical body on the upper end of said stake, said body having upper and lower stop flanges thereon, a sleeve having a cylindrical bore slidably mounted on said body between said stop flanges, a lateral socket on said sleeve for receiving and supporting the handle of the umbrella, said sleeve being shorter than the distance between said stop flanges so as to permit said sleeve to be reciprocated to strike the lower stop flange for driving the stake and to strike the upper stop flange for lifting the stake from the ground.

3. A holder for a beach or lawn umbrella, said holder comprising a stake adapted to be driven into the beach or lawn, a cylindrical body on the upper end of said stake, said body having upper and lower stop flanges thereon, a sleeve having a cylindrical bore slidably mounted on said body between said stop flanges, a lateral socket on said sleeve for receiving and supporting the handle of the umbrella, said sleeve being shorter than the distance between said stop flanges so as to permit said sleeve to be reciprocated to strike the lower stop flange for driving the stake and to strike the upper stop flange for lifting the stake from the ground, manual locking means for locking said sleeve in a selected vertical position on said cylindrical body to determine the elevation of the umbrella.

4. A holder for a beach or lawn umbrella, said holder comprising a stake adapted to be driven into the beach or lawn, a cylindrical body on the upper end of the stake, said body having upper and lower stop flanges thereon, a sleeve having a cylindrical bore slidably mounted on said body between said stop flanges, a lateral socket on said sleeve for receiving and supporting the handle of the umbrella, said sleeve being rotatable on said cylindrical body, and manual locking means for locking said sleeve on said body in an adjusted position of rotation, and at a selected height on said cylindrical body.

5. A manually applicable and removable holder for a beach or lawn umbrella comprising an anchoring element adapted to be hammered and thus embedded in the beach or lawn, an impact receiving anvil forming element on the upper end of said member, an umbrella accommodation and holding unit including a reciprocable hammer forming sleeve adapted to forcibly strike said anvil, and guide and retention means for said sleeve attached to and projecting above said anvil.

6. A holder for a beach or lawn umbrella comprising a stake to be driven into and out of the ground, a carrier for the umbrella, means to mount said carrier on said stake, said means being manually reciprocable in opposite directions longitudinally of the stake, and abutment forming means on said stake for engagement by said mounting means to drive the stake into and out of the ground under reciprocation of said mounting means in opposite directions, respectively.

RONALD CLAIR SHANNON.